Sept. 15, 1936.   L. T. FOLSOM   2,054,076
DYNAMOMETER
Filed June 1, 1934
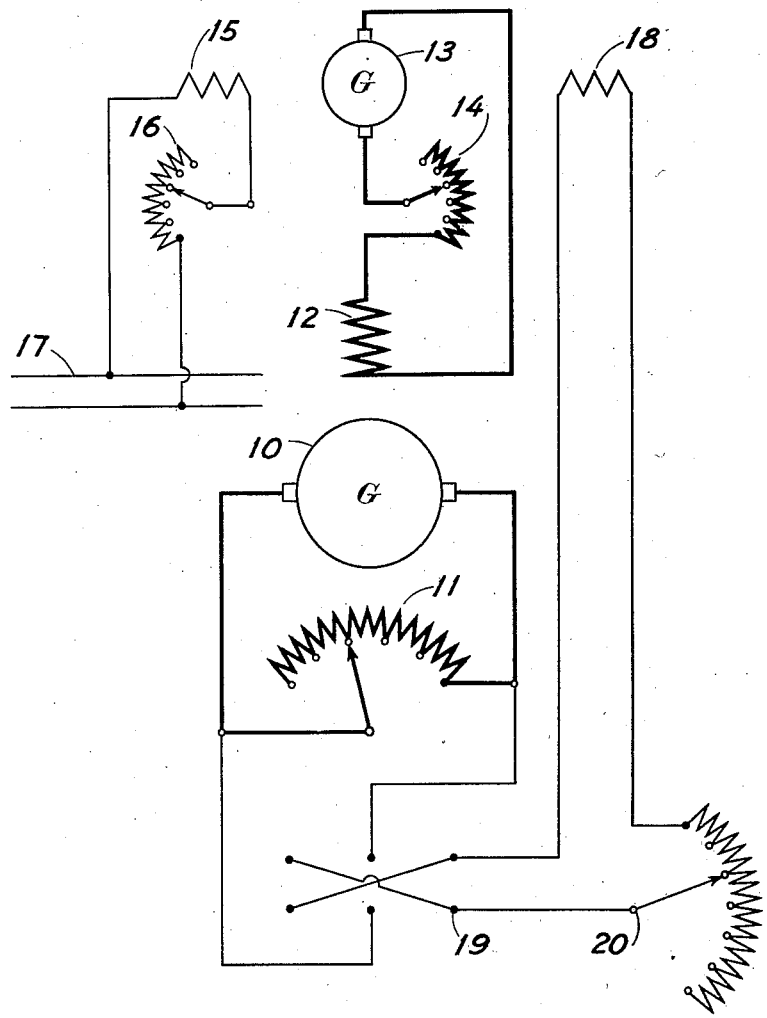
Inventor
Leon T. Folsom
By: J. H. Adams
Attorney Patented Sept. 15, 1936

2,054,076

UNITED STATES PATENT OFFICE 2,054,076

DYNAMOMETER

Leon T. Folsom, Berkeley, Calif., assignor to Standard Oil Company of California, San Francisco, Calif., a corporation of Delaware Application June 1, 1934, Serial No. 728,549

4 Claims. (Cl. 265—24)

This invention relates to an electrical dynamometer and particularly one which is adapted to impose a load of certain characteristics upon a power source such as an automobile.

In the testing of certain types of power sources and particularly automotive vehicles, it becomes necessary to provide power absorption means which may be accurately calibrated so as to indicate the power output of the machine, together with any transmission equipment which may be used in conjunction therewith under all conditions of load and speed. A further requirement is that the power absorption means be adapted to closely approximate the conditions under which the prime mover and its accessories, such as an assembled automobile, may be operated. Many types of load-producing devices or dynamometers are in use, such as water brakes, Prony brakes, fan brakes and the like, the characteristics of which are fixed by certain well-known laws which need not be discussed in detail in this description.

One type of dynamometer which has been widely used in this field involves the use of a direct current power absorption generator. This generator may be fitted with a suitable power transmission, such as a flexible coupling, in case an internal combustion engine alone is to be tested, or a pair of drums rotating on bearings and set into the floor and adapted to be driven by the rear wheels of an automotive vehicle which is securely anchored, so that the only relative motion is between the rear or driving wheels of the vehicle and the drums. These drums may be geared or belted to the shaft of the direct current power absorption generator mentioned above, which may be mounted to form the well-known "cradle" dynamometer. If desired, the generator may be mounted rigidly, and its output to an energy-dissipating resistance measured in the conventional way by means of a wattmeter. Such an electrical generator operating with constant field excitation has a power-speed characteristic which follows approximately the relationship $P \propto N^2$ (P is proportional to $N^2$) where P represents power and N represents speed, in suitable units. This will be explained in more detail in the following description.

Laboratory testing of certain prime movers, notably internal combustion engines, and the vehicles which they are adapted to propel, entails the approximation, in the laboratory, of conditions encountered on the road. Of these, the primary one is resistance to motion of the automobile, if such is being tested.

The laws governing the resistance to motion of such a vehicle are known to within reasonable limits. It may be said that, for an automobile operating on a level road, the power required for propulsion is absorbed by two factors: the internal friction in the machine, which is proportional to the speed, and may be expressed thus—$P_1 \propto N$; and the wind resistance, which is proportional to the third power of the speed and may be expressed thus—$P_2 \propto N^3$. In addition, should the automobile be required to ascend a grade, there will be a further power requirement, which is proportional to the speed for any given grade and may be expressed thus—$P_3 \propto N$. The total power will then vary as the sum of the three expressions above, which include friction, wind resistance, and the overcoming of gravity, respectively, and may be expressed thus—

$$P = P_1 + P_2 + P_3 \propto K_1 N + K_2 N^3 + K_3 N$$

in which $K_1$, $K_2$ and $K_3$ represent well-known coefficients involving the respective components.

A curve may be drawn for any car of given size and weight characteristics, plotting power requirements of wind resistance, grade and friction against speed. It will be found that for a given range of operating conditions, say 15 to 50 miles per hour, a curve of the general equation $P \propto N^m$, where "m" lies between the approximate limits of 1.06 to 1.80, depending upon the grade of the assumed road together with the friction and wind resistance co-efficient of the car under consideration, will closely approach the curve obtained from the summation equation of the preceding paragraph. If, however, the friction and grade components are very small, the wind resistance with its exponent of 3 would predominate, so that "m" may conceivably vary from 1 to about 3.

Therefore, the power loading and measuring mechanism, in order to simulate in the laboratory the conditions of actual service must be capable of automatically maintaining, with varying loads, the power-speed relationship of $P \propto N^m$, where "m" may be predetermined to lie at any point between the approximate limits of 1 and 3. Heretofore, as pointed out above, the electrical dynamometers available would only automatically maintain such a relation for an exponent of approximately 2, although manipulation of the controls would give isolated constant load points of any desired exponent.

It is an object of this invention to provide an apparatus for loading a power source of the type described which will duplicate its natural load-speed characteristics in actual operation as well as measure its power output.

A further object is to provide an apparatus for loading a power source such as an automotive vehicle which will duplicate its actual operating characteristics by causing the power absorbing means to have a definite and predetermined relationship to its speed.

Another object is to provide an apparatus for absorbing the power output of an automobile, which will approximate the friction, windage and grade loads or any combination of them that may be encountered in actual operation.

Another object is to provide an improved form of an electrical dynamometer, in which the exponential relationship between power and speed may automatically be maintained at any given value between the limits of one and three.

A still further object is to provide an improved electrical dynamometer, involving a shunt generator and a separate excitation source whereby new and hitherto unattained power-speed relationships may be continuously and automatically obtained.

These and other objects will be more fully apparent from the description which follows, and from the accompanying drawing of a typical connection diagram, which forms a part of this specification and illustrates a preferred embodiment of this invention. This drawing is diagrammatic only and shows none of the usual and conventional measuring instruments, but only the main and control circuits, which will clearly illustrate the application of the invention.

The main generator 10 is of the separately excited shunt wound type and may be connected as shown to a loading rheostat 11 of the customary heavy construction to dissipate the absorbed energy in the form of heat. The main generator 10 may be mounted in bearings and provided with the customary scale beam to form a conventional "cradle" dynamometer, or it may be rigidly mounted and its output measured with a wattmeter in the usual manner. The power transmitting apparatus between the power generating equipment undergoing test and the dynamometer may be of any of the well known types adapted to the particular conditions involved, and is not pertinent to this discussion.

The shunt field 12 of the main generator 10 is shown as being excited by a separately driven constant speed direct current generator 13 and is controlled by rheostat 14. The exciter generator 13 is provided with the usual field winding 15 and rheostat 16, which circuit is supplied with direct current from a separate source 17 to give any desired uniform excitation. In addition to the regular field winding 15, however, is a supplementary field winding 18 independent of any circuit of the exciter generator 13. Field winding 18 is connected to the output terminals of the main generator 10, as shown, through a reversing switch 19 and a control rheostat 20. This field winding 18 may be the usual series field found on compound wound generators.

By this arrangement field winding 18 of exciter generator 13 may be connected to increase or decrease the normal constant excitation of generator 13 through the agency of reversing switch 19. This increase or decrease will be in proportion to the terminal voltage of main generator 10, and will thereby increase or decrease the terminal voltage of exciter generator 13 and the resultant excitation of the shunt field 12 of main generator 10.

If the circuit through supplementary field 18, reversing switch 19 and rheostat 20 is opened, main generator 10 will have constant field excitation due to the constant excitation of exciter generator 13 and will have a terminal voltage against speed relationship having an exponent "$m$" equal to 1 ($m=1$) or voltage $\propto$ speed.

Since the power P dissipated in a constant resistance R (rheostat 11) having an impressed voltage E is $$P = \frac{E^2}{R}$$

by Ohm's law it follows that the power-speed relationship would be substantially $P \propto N^2$ where N is the speed. This is the usual case of an electrical generator dynamometer operating with a constant field excitation from some external source.

If the circuit through supplementary field 18, reversing switch 19 and rheostat 20 is closed in a direction to increase the excitation of the exciter generator 13, let us consider the effect of a drop in speed (N) of the power source which is driving the main generator 10, assuming no adjustments are made in any circuit. A step-by-step consideration will be found most simple. When the speed (N) of main generator 10 decreases, its terminal voltage will decrease proportionately, all other things remaining constant. Thus such a change will result in a lessening of the excitation of exciter generator 13 by virtue of the decrease in current through supplementary field 18. Thus, the terminal voltage of exciter generator 13 will decrease in turn, causing a decrease in the excitation of the main generator 10 and resulting in a further decrease in terminal voltage of main generator 10 below that originally caused by the change in speed. These changes will automatically continue until an equilibrium condition is reached, due to the well known inherent electrical characteristics of the machines involved.

It is thus evident that the terminal voltage of the main generator 10 is reduced a greater amount than that caused solely by the decrease in speed assumed above. In other words, the rate of reduction in the terminal voltage of main generator 10 with respect to speed (N) is greater than a direct proportion so that the voltage-speed relationship would be expressed approximately by an equation of the type $$E \propto N^{(m>1)}$$

($m$ greater than 1)

and power $\qquad P \propto N^{(m>2)}$

If the reversing switch 19 were thrown to the opposite position, so that the supplementary field 18 decreased the excitation of the exciter generator 13, it is readily seen by an analysis similar to the one just outlined that the voltage-speed relationship would have an exponent ($m<1$) or ($m$ less than 1), or $\qquad E \propto N^{(m<1)}$ and $\qquad P \propto N^{(m<2)}$ Therefore, it is obvious that the power-speed relationship of the whole dynamometer assembly may be varied so that the effect of various speeds and grades upon an automotive vehicle, for example, may be closely simulated in a laboratory by proper positions and adjustments of the reversing switch 19 and the control rheostat 20. By means of the variable loading rheostat 11 and main generator shunt field rheostat 14, an adjustment of the maximum power dissipated at any given speed may be obtained. Thus there are only four controls to be adjusted for a given set of conditions. These are the reversing switch 19 and supplementary field control rheostat 20, which are arranged to reproduce the desired grade condition, and the load rheostat 11 and main generator shunt field rheostat 14 which are adjusted to reproduce the maximum load desired.

In practice, the arrangement described has been found to reproduce the power-speed requirements of actual road conditions quite faithfully.

Although a specific construction embodying this invention has been described and illustrated, it is to be understood that the invention is not limited to that arrangement, and all such modifications and changes as come within the scope of the following claims are embraced thereby.

I claim:

1. An electrical dynamometer for placing a load of controllable power-speed characteristics on a mechanical power source, comprising a main generator, a field winding on said main generator, a variable power absorption rheostat connected to the output terminals of said main generator, an exciter generator separately driven at a constant speed adapted to energize said main generator field, said exciter generator provided with a supplementary field winding, a reversing switch connected to the output terminals of said main generator, and a rheostat connected to one terminal of said reversing switch, said reversing switch, rheostat and supplementary exciter field being so connected that a portion of the main generator output may be used to automatically vary the voltage of said exciter generator to produce the desired power-speed relationship.

2. An electrical dynamometer for placing a load of controllable power-speed characteristics on a mechanical power source comprising a main generator, a field winding on said main generator, electric power absorption means connected to said generator, an exciter generator driven at a constant speed adapted to energize said main generator field, said exciter generator provided with a supplementary field winding, and variable current and polarity control means connected to said main generator and said supplementary exciter field so that the latter may be energized from said main generator to automatically vary the power-speed characteristics of said dynamometer.

3. An electrical dynamometer of the type described, comprising a main generator, electric power absorption means connected to said generator, a second generator driven at a constant speed adapted to excite said first named generator and provided with a supplementary field winding, and variable current and polarity control means connecting said supplementary field winding with said main generator whereby the power-speed relation of said main generator may be adjusted to cause the power absorbed by said absorption means to vary as a given exponent of the speed, said exponent being between about 1 and 3.

4. In combination with a main electrical generator adapted to be driven by a power source a separately driven exciter generator, a supplementary field winding on said exciter generator and means for selectively diverting a part of the electrical output of said main generator through said supplementary field, to increase or decrease the excitation thereof so that the power absorption characteristics of said main generator will automatically be maintained at a desired relation to the speed of said power source.

LEON T. FOLSOM.